… … …

United States Patent [19]

Hoff et al.

[11] 4,359,403

[45] Nov. 16, 1982

[54] POLYMERIZATION CATALYST AND METHOD

[75] Inventors: Raymond E. Hoff, Palatine; Thomas J. Pullukat, Hoffman Estates; Mitsuzo Shida, Barrington, all of Ill.

[73] Assignee: Chemplex Company, Rolling Meadows, Ill.

[21] Appl. No.: 253,732

[22] Filed: Apr. 13, 1981

[51] Int. Cl.$^3$ ............................ C08F 4/64; C08F 4/68
[52] U.S. Cl. ............................ 252/429 B; 252/429 C; 526/129; 526/137; 526/142; 526/156
[58] Field of Search ........................ 252/429 B, 429 C

[56] References Cited

U.S. PATENT DOCUMENTS

| | | | |
|---|---|---|---|
| 3,513,150 | 5/1970 | Matsuura et al. | 252/441 X |
| 3,787,384 | 1/1974 | Stevens et al. | 252/429 C X |
| 3,821,186 | 6/1974 | Grant | 252/429 C X |
| 3,888,789 | 6/1975 | Dombro et al. | 252/429 B |
| 3,936,431 | 2/1976 | Reginato et al. | 252/429 C X |
| 3,978,031 | 8/1976 | Reginato et al. | 252/429 C X |
| 4,004,071 | 1/1977 | Aishima et al. | 252/429 C X |
| 4,144,390 | 3/1979 | Derroitte et al. | 252/429 B X |
| 4,148,754 | 4/1979 | Strobel et al. | 252/429 C |
| 4,263,171 | 4/1981 | Shida et al. | 252/429 C |

FOREIGN PATENT DOCUMENTS 1484254 9/1977 United Kingdom .

OTHER PUBLICATIONS

Ziegler et al., "Organometallic Compounds XXII: Organomagnesium-Aluminum Complex Compounds", Annalen der Chemie, vol. 605, pp. 93-97, (1957).

*Primary Examiner*—Patrick Garvin
*Attorney, Agent, or Firm*—Wegner, McCord, Wood & Dalton

[57] ABSTRACT

An olefin polymerization and copolymerization catalyst active in the presence of an alkyl aluminum cocatalyst is prepared by mixing, in the presence of a solvent, particles of a silica or alumina material having reactive surface groups treated with a fluorine compound and with a compound of magnesiumhydrocarbyl or a complex of the general formula $(MgR_2)_m(AlR_3')_n$ where R and R' are alkyl or aryl groups and m/n is between about 0.5 and 10, inclusive, to form a hydrocarbon insoluble reaction product which is then mixed, in the presence of a solvent, with a titanium, vanadium or zirconium halide, oxyhalide or alkoxyhalide, followed by separation of the solvent. The disclosure also includes a method of making such catalysts and a method of making polymers of one or more 1-olefins by the use of these catalysts under polymerizing conditions.

35 Claims, No Drawings

POLYMERIZATION CATALYST AND METHOD

BACKGROUND OF THE INVENTION

This invention provides improved olefin polymerization catalysts, and method of making them, formed from solid oxides of silicon or aluminum, organomagnesium compounds, and titanium compounds. One type of such catalysts is formed by the interaction of a selected said oxide, an organomagnesium compound, and a titanium halide compound. The improvement is achieved principally by treating the oxide with a compound that contains fluorine.

The invention also provides improved methods of making polymers using the improved catalysts of the invention.

The organomagnesium compound of the catalyst may be a complex of a dialkyl magnesium compound with trialkylaluminum. Consequently, one object of this invention is to improve the catalysts disclosed in Shida et al. patent application Ser. No. 63,111 filed Aug. 1, 1979, and now U.S. Pat. No. 4,263,171 and assigned to the same assignee as is the present application. The fluorine treatment of this invention renders such catalysts more reactive at titanium levels of less than about 6% by weight. Thus, it becomes possible to prepare catalysts of this type with equivalent reactivity but with a decreased titanium content.

Another object of this invention is to provide catalysts for the manufacture of particle form polyethylene of high melt index with improved reactivity and higher melt index by combining the fluorine treatment of the silica with an alcohol modification.

The organomagnesium compound of the catalyst may be an uncomplexed dialkyl magnesium compound, an alkyl or aryl magnesium halide, or an ether complexed Grignard reagent. Consequently, in this respect the scope of this invention is broader than that of the above Sida et al. application invention.

Four prior art patents deal specifically with catalysts made with an organomagnesium compound and silica: U.S. Pat. No. 3,821,186, British Pat. No. 1,484,154, Sept. 1, 1977, U.S. Pat. No. 3,787,384 and U.S. Pat. No. 4,148,754.

The catalysts of this invention may be made in the same manner as those of the above Shida et al. application 63,111 except that the inorganic oxide is first treated with a fluorine compound. Fluorinated supports for olefin polymerization catalysts are described in U.S. Pat. Nos. 3,936,431 and 3,978,031. In U.S. Pat. No. 3,936,431, the support must be a complex oxide having the general formula $MgO \cdot Al_2O_3$, and after reaction with the fluorinating agent, the F/Al ratio must be from 0.1 to 0.15. In U.S. Pat. No. 3,978,031, the support must be alumina, which acquires a F/Al ratio of 0.01 to 0.30 by the fluorination reaction. Silica itself is not included in either of these patents.

In addition, neither discloses contacting the fluorinated support with an organomagnesium compound before contact with the titanium compound as in one aspect of this invention. These two patents reveal that organomagnesium compounds may be used in the role of a cocatalyst but in no other way.

U.S. Pat. No. 3,513,150 describes treating gamma-alumina with gaseous titanium tetrachloride, and then a gas containing a chlorinating agent, for the purpose of making an olefin polymerization catalyst.

U.S. Pat. No. 3,888,789 teaches treating a high surface area oxide with a halogenating agent $X_2$ or $RX_n$, where X is preferably chlorine or bromine, and R is SO, $SO_2$ or a hydrocarbon radical.

In U.S. Pat. No. 4,144,390, a magnesium alkoxide or phenoxide is treated with a halogenating agent as a first step in catalyst preparation.

SUMMARY OF THE INVENTION

The catalyst of this invention is highly active and is suitable for polymerization of ethylene and other 1-olefins, particularly of 2–8 carbon atoms, and copolymerization of these with 1-olefins of 2–20 carbon atoms, such as propylene, butene and hexene, for example, to form copolymers of low- and medium-densities. It is equally well suited for particle form and gas phase polymerization processes, and is especially effective in the selective production of high-density polyethylene having a narrow molecular weight distribution and high melt index for injection molding applications. The catalysts is also well suited for the production of high-strength fibers or film having a low melt index.

The catalyst does not require an excess of titanium and therefore obviates the need for removal of catalyst residues from product polymer. The catalyst is suitable for use in particle form polymerization plants designed for prior silica-supported chromium oxide catalysts. Heretofore, titanium catalysts have not been extensively used in such plants due to the substantial excess of corrosive titanium compounds typically used in the preparation of such catalysts. The present catalyst is easily injected into particle form reactors by means of well known automatic feeding valves, and corrosion-resistant materials of construction are not required.

The improved catalyst of the invention is prepared by combining, in the presence of a solvent, an organomagnesium compound or a complex of the general formula $(MgR_2)_m(AlR_3')_n$ with particles of an inorganic oxide material, having reactive groups, that has been treated with a fluorine compound. These reactive groups may be hydroxyls and/or oxide linkages or similar surface groups. This reaction product is then reacted, in the presence of a solvent, with a halogen-containing transition metal compound to form a supported catalyst component, followed by removal of the solvent. The catalyst component prepared according to the foregoing is active in the presence of an effective quantity of an alkyl aluminum cocatalyst, preferably comprising a trialkyl aluminum compound.

The inorganic oxide material is chosen from the group consisting of silica, alumina and silica-alumina. The inorganic oxide material is utilized in finely divided form and may be preactivated by heating in an inert atmosphere at temperatures of up to about 900° C.

The fluorine treatment of the support of this invention makes catalysts of the above Shida et al. application type substantially more reactive for ethylene polymerization when the catalyst contains less than about six weight percent titanium. This increased reactivity is of most practical significance when a high partial pressure of hydrogen is added to the polymerization reaction in order to form very high melt index polyethylene.

In addition, the fluorine treated catalysts of this invention can be further modified with alcohols so that there is a greater response to hydrogen, thereby facilitating the production of very high melt index polyethylene in the particle form process. The fluorine treated catalysts do not suffer a reactivity loss upon alcohol treatment to the same degree as the catalysts without the fluorine compound treatment.

The magnesium compounds of the invention have the general formulas $RMgX$, $R_2Mg$, $RMgOR'$ and $(MgR_2)_m(AlR_3')_n$ where R and R' are alkyl or aryl groups and m/n is between about 0.5 and 10, inclusive. R and R' may be the same or different alkyl groups of up to about 12 carbon atoms, and X is halide. The organomagnesium compound may be complexed with an ether as in a Grignard reagent.

The transition metal compound is of the general formula $Tr(OR)_aX_{4-a}$ or $TrOX_3$ wherein Tr is a transition metal selected from the group consisting of titanium, vanadium and zirconium, R is an alkyl group of less than about 20 carbon atoms, X is a halogen atom and a is zero or an integer less than 4. Titanium compounds are preferred for highest reactivity.

The transition metal compound is reacted with the reaction product of the organomagnesium compound and the fluorine compound treated inorganic material, preferably in equimolar ratio, so that the resultant solid catalyst component incorporates substantially all of the titanium in a highly active form. It is therefore unnecessary to remove nonreactive titanium from the catalyst or from product polymer, as opposed to prior titanium catalysts which require excessive titanium during preparation.

The catalyst is, because of its high activity, equally well suited for use in the particle form polymerization process in which the solid catalyst component, the cocatalyst, and olefin monomer are contacted in a suitable solvent, such as the solvent used in the catalyst forming reaction, or in a gas phase process in which no solvent is necessary.

Product polymer melt index (MI) is readily controlled by polymerization temperature control, or by hydrogen addition. Due to the catalyst's high activity, a relatively high partial pressure of hydrogen may be used in order to result in a high product melt index. Also, the catalyst's high activity makes feasible copolymerization of olefins less reactive than ethylene.

DESCRIPTION OF THE PREFERRED EMBODIMENTS

Thus, as can be seen from the above, improved catalysts for the polymerization of olefins are made from a reactive support material, an organomagnesium ingredient and a transition metal, e.g. titanium, compound. The catalyst is formed by the reaction of an organomagnesium compound with silica, followed by reaction with a transition metal halide. The reactive support is silica or alumina which has been treated with a fluorine compound.

Suitable inorganic oxide materials include silica alumina and silica-alumina, with silica being preferred. The inorganic oxide may contain small amounts of materials such as magnesia, titania, zirconia and thoria, among others.

It is necessary to dry the inorganic oxide material before contact with the magnesium-aluminum complex. In this invention, the drying is accomplished by reaction with a fluorinating agent with simultaneous or subsequent heating to complete the reaction and expel byproducts. The temperature needed is less than 700°C., e.g. 200°–700° C.

1. The Fluorine Compound Treatment

In general, any fluorine compound which will react with silica to combine an effective amount of fluorine is suitable for use with this invention. Examples of gaseous fluorinating agents are $F_2$, $HF$, $BF_3$, $SiF_4$, $SF_4$, $SOF_2$, $XeF_2$ and $COF_2$. The treatment of silica with gaseous fluorinating agents is preferably conducted in a fluid bed at a temperature and duration adjusted to combine the desired amount of fluorine with the silica or alumina.

In most cases, the gaseous fluorinating agents are very reactive. The bed can be fluidized with nitrogen to which a small amount of the fluorinating agent is added. Examples of liquid fluorinating agents are boron trifluoride etherate, disulfur decafluoride, iodine pentafluoride, diethylamino sulfur trifluoride, and benzyl fluoride. The treatment of the silica or alumina can be done by mixing the liquid with the silica in an inert atmosphere. Any excess of the liquid fluorinating agent can be removed by distillation at normal pressure, or at reduced pressure if needed. Vacuum or heat treatment of the reaction mixture also serves to remove reaction products not chemically combined with the solid oxide.

Solutions of fluorinating agents, such as fluoboric acid in water or hydrofluoric acid, can also be used. In this case, the water must be removed before catalyst preparation. In most cases it is preferred to use solid fluorinating agents such as ammonium hexafluorotitanate, ammonium hexafluoro-silicate, ammonium fluoborate and magnesium fluoborate. These complex salts can be dry mixed with the silica or alumina and the combination can then be heated to above the decomposition temperature of the complex salt to initiate the fluorinating reaction. Among these compounds, ammonium fluoborate is preferred. The heating can be done in a fluidized bed if desired.

The solid oxide can vary in particle size, surface area, and pore volume. Porous silicas of different surface areas are very suitable for this invention, for example, Davison Chemical Company grades 952, 951 and 56ID. These grades and similar silica materials fluidize readily and are well suited to the fluid bed treatment described above. Very finely divided, nonporous silicas made from silicon tetrachloride can also be used for this invention. These materials are available in several grades with tradenames Aerosil and Cab-O-Sil. Such silicas do not satisfactorily fluidize under normal conditions, consequently for Aerosil and Cab-O-Sil silicas the use of liquid fluorinating agents is preferred. Likewise the use of liquid fluorinating agents is preferred for very dense silica materials such as the Glas Shot ® of the Cataphote Corporation. Diatomaceous silicas can also be used in this invention.

The fluorinating agent reacts primarily with the surface of the silica so that only small changes in the particle size, pore volume, and surface area of the silica result. In this invention, the amount of combined fluorine per unit surface area of the silica must be controlled. After treatment, the silica should contain less than about $2 \times 10^{-4}$ g of chemically bonded fluorine per square meter of silica surface area. Preferably the amount of bonded fluorine is $1.2 \times 10^{-4}$ g to $1.5 \times 10^{-4}$ g per square meter. In the case of Davison grade 952 silica, the amount of ammonium fluoborate dry mixed with the silica should be less than about 7 wt.%, preferably 4–6 wt.%. In the decomposition of ammonium fluoborate, hydrogen fluoride and boron trifluoride are formed. Both react with silica.

In catalysts where the silica is fluorinated Davison grade 952 silica, the amount of titanium is about 6 wt.% or less of the total catalyst weight. The preferred titanium range is 4-5 wt.%. If other solid oxides of different surface areas are used, the maximum and preferred amounts change in proportion to the surface area.

2. Treatment With a Magnesium Alkyl Compound or Complex

Particles of the inorganic oxide material after their treatment with a fluorine compound and heat treatment are initially reacted with an organomagnesium compound or complex of the general formulas $MgR_2$ or $(MgR_2)_m(AlR_3')_n$ in which R and R' are the same or different alkyl groups and the ratio m/n is within the range of about 0.5 to about 10, and preferably between about 2 and 10.

The alkyl groups R bonded to the magnesium atom may be the same or different, and each has between 2 and 12 carbon atoms. When the R groups are identical, it is preferred that each have at least 4 carbon atoms, and are preferably butyl or hexyl groups. The alkyl groups R' are preferably ethyl groups.

The reaction between the magnesium compound and the inorganic oxide particles treated with the fluorine containing compound is carried out in a solvent, preferably at room temperature for convenience. The catalyst-forming reactions may be carried out at higher or lower temperatures, if desired.

The amount of the magnesium-aluminum complex is chosen such that the total number of moles of magnesium and aluminum is between about 0.1 and 10 times the number of moles of transition metal, the amount of which is chosen with reference to the weight of inorganic oxide, as is described below. It is preferred that magnesium be present in equimolar ratio to the transition metal compound.

The magnesium-aluminum complex is known in the art, as disclosed in Aishima et al. U.S. Pat. No. 4,004,071 (Jan. 18,1977) at col. 2, 11. 34-40 and col. 3, 11. 30-36. The complex is readily prepared according to the teachings of Ziegler et al., "Organometallic Compounds XXII: Organomagnesium-Aluminum Complex Compounds", *Annalen der Chemie, Vol.* 605, pages 93-97 (1957).

3. Transition Metal Compound

After the fluorinated inorganic oxides particles are completely reacted with the organomagnesium alkyl compound or complex, a selected halogen-containing transition metal compound is reacted with the resulting hydrogen insoluble reaction product to form an active solid catalyst component. The catalyst-forming reaction is carried out in a solvent, preferably a hydrocarbon, and preferably at room temperature.

The transition metal compound is selected from those of the general formula $Tr(OR)_aX_{4-a}$ or $TrOX_3$ wherein Tr is titanium, vanadium or zirconium, R is an alkyl group of less than about 20 carbon atoms, X is a halogen atom and a is zero or an integer less than 4. Suitable transition metal halides include $TiCl_4$, $Ti(OR)Cl_3$, $Ti(OR)_2Cl_2$, $Ti(OR)_3Cl$, $VOCl_3$, $VCl_4$, $ZrCl_4$ and others commonly used in conventional Ziegler catalysts.

For optimum reactivity, the transition metal is added to the inorganic oxide-magnesium compound reaction product in equimolar ratio to the total magnesium and aluminum present. For each mole of organomagnesium compound, the number of moles of transition metal should equal m+n.

The ratio of transition metal compound with respect to the inorganic oxide material may vary over a relatively wide range, although it has been found that the best results are obtained with a transition metal content of between about 0.25 and 2.0 mmoles per mmole of active surface hydroxyl and oxide groups on the inorganic oxide material. Preferably, between 0.6 and 2.5 mmoles of transition metal compound should be added to the reaction mixture per gram of inorganic oxide material.

4. Solvent Removal

After formation of the solid catalyst component by reaction of the transition metal compound with the inorganic oxide-magnesium compound reaction product, the solvent present in the catalyst-forming reaction must be removed under an inert atmosphere. For example, solvent removal may be by evaporation at a temperature between about 90° C. and 100° C. under a nitrogen atmosphere for from about ½ to 10 hours, or until dry. If desired, the solvent can be removed by filtration or centrifuging and the catalyst may be subjected to repeated solvent extractions. In this invention, however, simple evaporation is preferred.

Solvent removal is necessary to insure that product polymer is formed in small particles suitable for a particle form process rather than in sheets, fibers or chunks which rapidly foul the reactor and decrease reaction efficiency.

After solvent removal, the catalyst may advantageously be added to a solvent for reaction therein, as in the particle form polymerization process. The solvent added to the catalyst may be the same solvent used in the catalyst forming reaction, if desired, or may be any other suitable solvent. The catalyst exhibits no loss in activity due to addition to solvent.

5. Cocatalyst

The catalyst prepared as described above is active in the presence of an alkyl aluminum cocatalyst. Trialkyl aluminum compounds such as triisobutyl aluminum (TIBAL) are preferred cocatalysts. The alkyl aluminum compound is fed to the polymerization reaction zone separately from the solid catalyst component.

The proportion of cocatalyst to solid catalyst component may be varied, depending on the transition metal concentration in the solid catalyst component. In the case of TIBAL, excellent results have been obtained with as low as 4.6 mmole cocatalyst per gram of solid catalyst component.

6. Reaction Conditions

The particle form reaction system is characterized by the introduction of monomer to an agitated catalyst-solvent slurry. The solvent, typically isobutane, may be the solvent in which the catalyst preparation reaction is carried out. This type of reaction is best carried out in a closed vessel to facilitate pressure and temperature regulation. Pressure may be regulated by the addition of nitrogen and/or hydrogen to the vessel. Addition of the latter is useful for regulation of the molecular weight distribution and average molecular weight of product polymer, as is well known in the art.

Particle form polymerization of ethylene with the catalyst of this invention is best carried out at about 105°

C. to 110° C. at a pressure of between 35 and 40 atmospheres. In gas phase polymerization, the temperature may range from less than about 85° C. to about 100° C. with a pressure as low as about 20 atmospheres. Copolymers may be produced by either process by addition of propylene, butene-1, hexene-1 and similar alpha olefins to the reactor. Production of copolymers of relatively low density is preferably carried out at temperatures from about 60° C. to 78° C.

In the alcohol modification of this catalyst many commonly available alcohols can be used. Primary aliphatic liquid alcohols are preferred, and ethyl alcohol, propyl alcohol, and n-butyl alcohol are the most convenient. The dry alcohol can be combined with the fluorinated silica before or after the solid oxide is reacted with the organomagnesium compound. The molar ratio of alcohol to the organomagnesium compound can be as high as about 10, but generally a ratio of 0.5 to 2.0 is sufficient to effect a desirable increase in melt index by enhancing the transfer reaction with hydrogen.

EXAMPLE 1

The effect of using ammonium fluoborate as the fluorinating agent was demonstrated in a series of polymerization reactions, all conducted at 215° F. in isobutane with 50 psig hydrogen added and ethylene as required to maintain the total pressure at 550 psig. Triisobutylaluminum was used as a cocatalyst at 9.2 millimoles per gram of solid catalyst component. The solid catalyst component was prepared from Davison Chemical Company grade 952 silica.

Different samples of the silica were dry mixed with different amounts of ammonium fluoborate and the mixtures were heated at 600° C. for five hours with nitrogen fluidization. A portion of each silica sample was made into a catalyst as follows. A known weight was added to a dry, $N_2$-purged flask and stirred under flowing $N_2$ for one hour or more at room temperature. A solution in heptane of a dibutyl magnesium-triethylaluminum complex was then added. The combination was stirred for thirty minutes at room temperature, then titanium tetrachloride in an amount equimolar to the dibutyl magnesium was added. The reaction mixture was stirred for 30 minutes under flowing $N_2$, then the solvent was evaporated by heating at 90°–95° C. After the solvent was evaporated, portions of the free flowing catalyst were tested as described. The reactivities of the catalyst are shown in the table below. It can be clearly seen that treatment with the fluorinating agent at 2.5 and 5.0 percent increases the reactivity substantially. However, at 7 percent the effect of the fluorinating agent is delerterious.

TABLE I

| NH$_4$BF$_4$ Wt. % of Silica | Catalyst Reactivities; g/g of Catalyst per hr. Titanium - Weight Percent of Total Catalyst | | |
|---|---|---|---|
| | 4.2 | 4.6 | 6.1 |
| 0 | 1260 | 1520 | 4400 |
| 1 | 1160 | — | 6600 |
| 2.5 | — | 2900 | 6800 |
| 5.0 | 3700 | 4700 | 9900 |
| 7.0 | Dead | — | 3000–5000 (Unstable Catalyst) |

EXAMPLE 2

Another series of catalysts was prepared using Davison 952 silica which had been treated with 2.5 wt.% ammonium fluoborate as described in Example 1. The catalyst preparation procedure was the same as described in Example 1 except that the ratio of dibutyl magnesium to titanium tetrachloride was 0.8, and n-butyl alcohol was added to some of the catalysts. The alcohol was added to the silica just before the addition of the dibutyl magnesium complex solution. After the solvent was evaporated, the catalysts were tested in polymerization reactions at 215° F. with 50 and 100 psig of added hydrogen. The results given in Table II show that the melt index of the particle form polyethylene produced increases with increased amounts of n-butyl alcohol. The titanium content of these catalysts was about 5.5 wt.% on a solvent-free basis.

TABLE II

| {n-BuOH} {Bu$_2$Mg} | H$_2$, psig | Reactivity g/g cat./hr. | Melt Index |
|---|---|---|---|
| 0.36 | 50 | 2754 | 1.2 |
| 1.0 | 50 | 2244 | 1.6 |
| 2.0 | 50 | 2187 | 4.1 |
| 0 | 100 | 2782 | 3.6 |
| 0.36 | 100 | 1154 | 7.25 |
| 1.0 | 100 | 1554 | 12.7 |
| 2.0 | 100 | 1000 | 14.7 |

EXAMPLE 3

This example shows that the fluorided silica can be treated with the organomagnesium compound before the alcohol modifier is added.

A quantity of Davison Chemical Company grade 952 silica was mixed with a quantity of dry ammonium fluoborate which was 5% silica weight. The mixture was heated in a fluidized bed with nitrogen flow for 3 hours at about 600° C. After cooling the fluorided silica was kept dry. A 14.8 g quantity of this was added to a dry flask under flowing nitrogen. After 30 minutes, 62.8 ml of an 8.9 wt.% solution of dibutyl magnesium-triethylaluminum complex in heptane was added. The approximate formula of the complex was $(Bu_2Mg)_{6.1}Et_3Al$. After mixing 4.06 ml of n-butyl alcohol was added dropwise with constant stirring. Following this 40 ml of hexane was added and the mixture was stirred for 30 minutes. A 2.4 ml volume of titanium tetrachloride was added, and after another 30 minutes of stirring at room temperature under nitrogen flow, the flask was put into an oil bath at 90° C. The flask was kept in the bath until the solvents were evaporated and a free-flowing powder remained.

A portion of this catalyst was tested in particle form polymerization as described in Example 1. The reactivity was found to be 1520 g/g cat./hr. and the melt index was 2.4.

All parts and percentages herein are by weight.

Abbreviations used herein to identify chemical ingredients and product characteristics include:
HLMI—high load melt index
MI—melt index (ASTM D-1238 52T)
R$_D$—rheological dispersity
TIBAL—triisobutyl aluminum

We claim:
1. An olefin polymerization and copolymerization catalyst active in the presence of an alkyl aluminum cocatalyst prepared by mixing, in the presence of a solvent, reactive materials comprising particles of an inorganic oxide having active surface hydroxyl or oxide groups chosen from the group consisting of silica, alumina and silica-alumina, said particles having been fluorided with a fluorine compound and then heated at between about 50° C. and 700° C. to provide less than about $2 \times 10^{-4}$ g of chemically bonded fluorine per square meter of particle surface area, and a compound of the general formulas $MgR_2$ or $(MgR_2)_m(AlR_3')_n$ where R and R' are alkyl groups and m/n is between about 0.5 and 10, inclusive, to form a reaction mixture of said solvent and a hydrocarbon insoluble first reaction product, and mixing said reaction mixture with a halide, oxyhalide or alkoxyhalide of a metal chosen from the group consisting of titanium, vanadium and zirconium to form a second reaction product.

2. An olefin polymerization and copolymerization catalyst active in the presence of an alkyl aluminum cocatalyst, prepared by the consecutive steps of:
 (a) fluoridating particles of silica or alumina having active surface hydroxyl or oxide groups with a fluorine compound with simultaneous or subsequent heating between 50° C. and 700° C. as required to complete the reaction and expel the by-products and provide less than about $2 \times 10^{-4}$ g of chemically bonded fluorine per square meter of particle surface area;
 (b) reacting said particles of (a) in the presence of a hydrocarbon solvent with a compound or complex of the general formula $(MgR_2)_m(AlR_3')_n$ or $MgR_2$ wherein R and R' are alkyl groups and m/n is between about 0.5 and 10, inclusive, to form a reaction mixture of said solvent and a first reaction product insoluble in said solvent; and
 (c) reacting said first reaction product of (b) in said reaction mixture with a halogen-containing transition metal compound to form a second reaction product, said transition metal compound being selected from the group consisting of $Tr(OR'')_aX_{4-a}$ and $TrOX_3$, wherein Tr is a transition metal selected from the group consisting of titanium, vanadium, and zirconium, R'' is an alkyl group (of about 1-20 carbon atoms, X is a halogen atom, and a is zero or an integer less than 4.

3. The catalyst of claim 2 wherein between about 0.6 and 5.0 mmoles of said transition metal compound is present per gram of said inorganic oxide.

4. The catalyst of claim 3 wherein between about 0.25 and 2.0 mmoles of said transition metal compound is present per mole of said active hydroxyl and oxide groups on said inorganic oxide.

5. The catalyst of claim 3 wherein said transition metal compound is added in equimolar ratio to the total magnesium and aluminum present in said first reaction product.

6. The catalyst of claim 2 wherein m/n is between about 2 and 10.

7. The catalyst of claim 2 wherein said transition metal compound is chosen from the group consisting of $TiCl_4$, $Ti(OR'')Cl_3$, $Ti(OR'')_2Cl_2$, $Ti(OR'')_3Cl$, $VOCl_3$, $VCl_4$ and $ZrCl_4$.

8. The catalyst of claim 2 wherein R has between 2 and 12 carbon atoms.

9. The catalyst of claim 8 wherein R is butyl, R' is ethyl, and m/n is about 6.5.

10. The catalyst of claim 9 wherein said transition metal compound is $TiCl_4$.

11. The catalyst of claim 2 wherein said fluorine compound is a gaseous fluorinating agent reactive with said particles to combine fluorine therewith and provide about $1.2–1.5 \times 10^{-4}$ g of chemically bonded fluorine per square meter of particle surface area.

12. The catalyst of claim 11 wherein said reaction is conducted by fluoridizing the said inorganic oxide particles with an inert gas containing an effective amount of the fluorinating agent at a temperature and time to combine the fluorine with said support material particles.

13. The catalyst of claim 2 wherein the fluorided particles of (a) are treated with a dry alcohol before step (b).

14. The catalyst of claim 2 wherein the fluorided particles of (a) are treated with a dry alcohol after step (b).

15. The catalyst of claim 13 wherein said alcohol is a liquid primary aliphatic alcohol.

16. The catalyst of claim 15 wherein the molar ratio of said alcohol to said organomagnesium compound is from an effective ratio to about 10.

17. The catalyst of claim 16 wherein said ratio is from about 0.5 to 2.0.

18. The method of preparing an olefin polymerization and copolymerization catalyst active in the presence of an alkyl aluminum cocatalyst comprising the consecutive steps of:
 (a) fluoridating particles of silica or alumina having active surface hydroxyl or oxide groups with a fluorine compound with simultaneous or subsequent heating between 50° C. and 700° C. as required to complete the reaction and expel the by-products and provide less than about $2 \times 10^{-4}$ g of chemically bonded fluorine per square meter of particle surface area;
 (b) reacting said particles of (a) in the presence of a hydrocarbon solvent with a compound or complex of the general formula $(MgR_2)_m(AlR_3')_n$ or $MgR_2$ wherein R and R' are alkyl groups and m/n is between about 0.5 and 10, inclusive, to form a reaction mixture of said solvent and a first reaction product insoluble in said solvent; and
 (c) reacting said first reaction product of (b) in said reaction mixture with a halogen-containing transition metal compound to form a second reaction product, said transition metal compound being selected from the group consisting of $Tr(OR'')_aX_{4-a}$ and $TrOX_3$, wherein Tr is a transition metal selected from the group consisting of titanium, vanadium, and zirconium, R'' is an alkyl group of about 1-20 carbon atoms, X is a halogen atom, and a is zero or an integer less than 4.

19. The method of claim 18 wherein between about 0.6 and 5.0 mmoles of said transition metal compound is present per gram of said inorganic oxide.

20. The method of claim 19 wherein between about 0.25 and 2.0 mmoles of said transition metal compound is present per mmole of said active hydroxyl and oxide groups on said inorganic oxide.

21. The method of claim 19 wherein said transition metal compound is added in equimolar ratio to the total magnesium and aluminum present in said first reaction product.

22. The method of claim 18 wherein m/n is between about 2 and 10.

23. The method of claim 18 wherein said transition metal compound is chosen from the group consisting of $TiCl_4$, $Ti(OR'')Cl_3$, $Ti(OR'')_2Cl_2$, $Ti(OR'')_3Cl$, $VOCl_3$, $VCl_4$ and $ZrCl_4$.

24. The method of claim 18 wherein R has between 2 and 12 carbon atoms.

25. The method of claim 24 wherein R is butyl, R' is ethyl, and m/n is about 6.5.

26. The method of claim 25 wherein said transition metal compound is $TiCl_4$.

27. The method of claim 18 wherein said fluorine compound is a gaseous fluorinating agent reactive with said particles to combine fluorine therewith and provide about $1.2-1.5 \times 10^{-4}$ g of chemically bonded fluorine per square meter of particle surface area.

28. The method of claim 27 wherein said reaction is conducted by fluidizing the said inorganic oxide particles with an inert gas containing an effective amount of the fluorinating agent at a temperature and time to combine the fluorine with the said support material particles.

29. The method of claim 18 wherein the fluorided particles of (a) are treated with a dry alcohol before step (b).

30. The method of claim 18 wherein the fluorided particles of (a) are treated with a dry alcohol after step (b).

31. The method of claim 29 wherein said alcohol is a liquid primary aliphatic alcohol.

32. The method of claim 31 wherein the molar ratio of said alcohol to said organomagnesium compound is from an effective ratio to about 10.

33. The method of claim 32 wherein said ratio is from about 0.5 to 2.0.

34. The catalyst of claim 14 wherein said alcohol is a liquid primary aliphatic alcohol.

35. The method of claim 30 wherein said alcohol is a liquid primary aliphatic alcohol.

* * * * *